US006462276B2

United States Patent
Shimizu et al.

(10) Patent No.: US 6,462,276 B2
(45) Date of Patent: Oct. 8, 2002

(54) POWER DISTRIBUTION BOX COVER WITH ANTI-RATTLE FEATURE

(75) Inventors: Kazuhiro Shimizu, West Bloomfield, MI (US); Xeng-Meng Vang Moua, Rochester Hills, MI (US)

(73) Assignee: Yazaki North America ( * ) Notice: Subject to any disclaimer, the term of this patent is extended or adjusted under 35 U.S.C. 154(b) by 0 days.

(21) Appl. No.: 09/755,929

(22) Filed: Jan. 5, 2001

(65) Prior Publication Data

US 2002/0088631 A1 Jul. 11, 2002

(51) Int. Cl.⁷ .................................................. H02G 3/08
(52) U.S. Cl. ........................ 174/65 R; 174/48; 220/3.3
(58) Field of Search .................. 174/65 R, 48, 174/49, 68.3, 95, 99 R, 72 A, 96, 97, 92; 220/3.8, 4.02, 4.01, 3.3, 3.2; 52/220.1, 220.3, 220.5, 220.7

(56) References Cited

U.S. PATENT DOCUMENTS

| 3,086,576 A | * | 4/1963 | Thaden .......................... 174/95 |
| 3,346,688 A | * | 10/1967 | Fields ......................... 174/68.3 |
| 3,391,432 A | * | 7/1968 | Du Rocher ................... 174/97 |
| 4,156,795 A | * | 5/1979 | Lacan ........................... 174/48 |
| 5,108,313 A | | 4/1992 | Adams |
| 5,115,260 A | * | 5/1992 | Hayward et al. .......... 174/72 A |
| 5,134,250 A | | 7/1992 | Caveney et al. |
| 5,240,209 A | | 8/1993 | Kutsch |
| 5,274,194 A | | 12/1993 | Belcher |
| 5,401,905 A | | 3/1995 | Lesser et al. |
| 5,696,351 A | * | 12/1997 | Benn et al. .................... 174/92 |
| 5,831,211 A | * | 11/1998 | Gartung et al. ............... 174/48 |
| 5,958,315 A | * | 9/1999 | Fatato et al. ................ 264/154 |
| 6,191,363 B1 | * | 2/2001 | Samuels ..................... 174/68.3 |
| 6,239,364 B1 | * | 5/2001 | Nickel .......................... 174/48 |
| 6,268,566 B1 | * | 7/2001 | Takiguchi et al. ......... 174/72 A |
| 6,274,812 B1 | * | 8/2001 | Daoud ...................... 174/65 R |

FOREIGN PATENT DOCUMENTS

| JP | 06307855 | 6/1996 |
| JP | 06325798 | 7/1996 |
| JP | 07196304 | 2/1997 |

* cited by examiner

Primary Examiner—Dean A. Reichard
Assistant Examiner—Angel R Estrada
(74) Attorney, Agent, or Firm—Young & Basile

(57) ABSTRACT

A power distribution box (PDB) cover of the type mated over a portion of a PDB base from which a plurality of relatively unconstrained wires or wire bundles extend. The cover mates with the base to cover and protect the wires, and to redirect them longitudinally through one or more open ends of the cover. The cover interior is provided with a plurality of rattle-preventing ribs which define a constraining volume for the wires which keeps the wires away from the sidewalls of the cover, which squeezes down high volume wire bundles to reduce wire movement, and which prevents wires in low volume bundles from rattling against the sidewalls of the cover.

4 Claims, 3 Drawing Sheets

POWER DISTRIBUTION BOX COVER WITH ANTI-RATTLE FEATURE

FIELD OF THE INVENTION

The present invention is in the field of automotive power distribution boxes, and more particularly the cover portion (usually the "lower" cover) covering wires or wire bundles.

BACKGROUND OF THE INVENTION

Power distribution boxes (PDB's) are commonly used in the automotive industry to streamline wiring by eliminating multi-branch wiring. A power distribution box consolidates branch circuits and fuses, connecting vehicle battery power to various electrical components. Small gauge electrical wires, numbering in the dozens or hundreds, are typically bound or bundled together in a "wire harness" leading to a PDB, where the wires are connected internally to mating terminals and connectors.

Referring to FIG. 1, a typical PDB arrangement is illustrated on an interior vehicle panel 10. A first wire harness 12, and in particular a branch 13b thereof, is routed into a first power distribution box 14 for electrical interconnection with a first set of consolidated branch circuits and fuses and further with the wires and circuits of a second harness 18 whose branch 18a is routed through a second power distribution box 16 and an interconnect harness 15.

Referring to FIGS. 2 and 3, power distribution box 14 is shown disassembled into its three basic components: a "base" 14c for mounting power terminals, connectors, wire terminating and rerouting structure, fuses, busbar and other known structure, sandwiched between and enclosed by protective upper and lower covers 14a, 14b. PDB base 14c will typically include a number of vertically oriented partitions, sockets, or terminals for making wire harness connections.

Various subsets of terminated wires 13a, 13b, 13c, etc. emanate from the lower side of base 14c and are merged by bundling or sheathing into the various wire harnesses such as 13b and 15 entering or exiting the PDB 14 from either side. The panel-or-through-like PDB structure illustrated is fairly typical, particularly in interior vehicle panel installations to accommodate the limited space between the vehicle panel 10 and any decorative and/or insulative interior covering. It will be understood by those skilled in the art, however, that the exemplary PDB structure illustrated in FIG. 2 is but one of many known variants whose specific shape and internal structure varies from application to application.

In general, the PDB wiring bundles 13a, 13b, 13c, etc. contained by the lower cover 14b have a tendency to rattle against the sides of the cover during vehicle operation. This is particularly irritating to vehicle operators and passengers when the PDB is installed in an interior vehicle panel as illustrated in FIG. 1, making the rattle quite audible to the occupants of the vehicle. Since unexplained rattles and the like are not only irritating but difficult to diagnose by the repair facility to which a rattle-prone vehicle is inevitably brought, automotive manufacturers place an emphasis on eliminating audible rattle in vehicle components, including the PDB.

A common prior art solution to the problem of rattling wires in a PDB is to glue or otherwise secure a shaped block of open-cell foam into the lower cover. The foam in its uncompressed state typically has sufficient volume that the wire bundles must first partially compress the foam before the PDB base 14c can be mated with the lower cover. Such foam-type solutions, while reducing and even eliminating rattle, are expensive and interfere with the assembly of the PDB, particularly in high volume wire bundle applications. Another problem with foam is that a standard PDB may be used in several locations in a vehicle or on different vehicles, in some cases accommodating high volume wire bundles and low volume wire bundles. Since the PDB's are pre-manufactured, the foam tends to be cut to a standard size and volume, which may be too great for high volume wire bundles and not enough to prevent the rattling of low volume wire bundles.

SUMMARY OF THE INVENTION

The present invention is an anti-rattle structure molded directly into the plastic wire cover of a PDB, equally suitable for both high volume and low volume wire bundles to prevent rattle of even low volume bundles without hindering the assembly of high volume bundles. The interior of the cover (usually the "lower" cover) is provided with a plurality of transverse, generally U-shaped ribs extending up each side and across the bottom of the cover. A plurality of the ribs are spaced along the length of the trough to define a reduced volume, reduced surface area passage for the wires which keeps the wires away from the flat, noisy plastic sidewalls and bottom of the cover.

In the preferred form, the upper ends of each rib are beveled or chamfered to smoothly guide wires extending from the PDB base into position as the parts of the PDB are being assembled.

These and other features and advantages of the invention will become apparent upon a further reading of the specification, in light of the accompanying drawings.

BRIEF DESCRIPTION OF THE DRAWINGS

FIG. 4 is a perspective view of a PDB lower cover according to the present invention, which cover is suitable for mating with the PDB of FIGS. 1 and 2 in place of the prior art cover.

FIG. 6 is an end view of the cover of FIGS. 4 and 5.

DETAILED DESCRIPTION OF THE ILLUSTRATED EMBODIMENT

Figure 1:
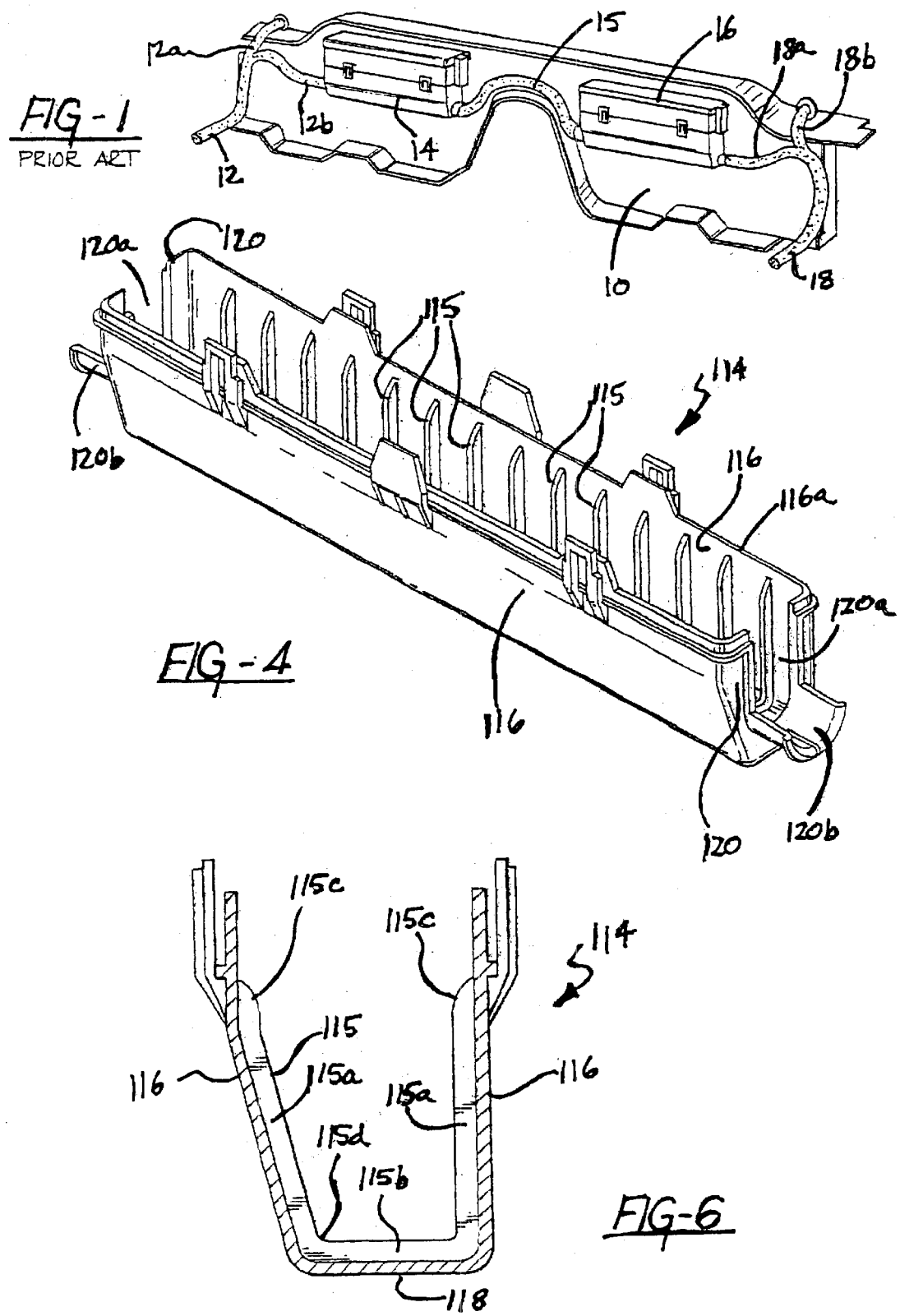
FIG. 1 is a perspective view of a typical interior vehicle panel mounting two power distribution boxes (PDB's) used to interconnect two wire harnesses.
Figures 2, 3:
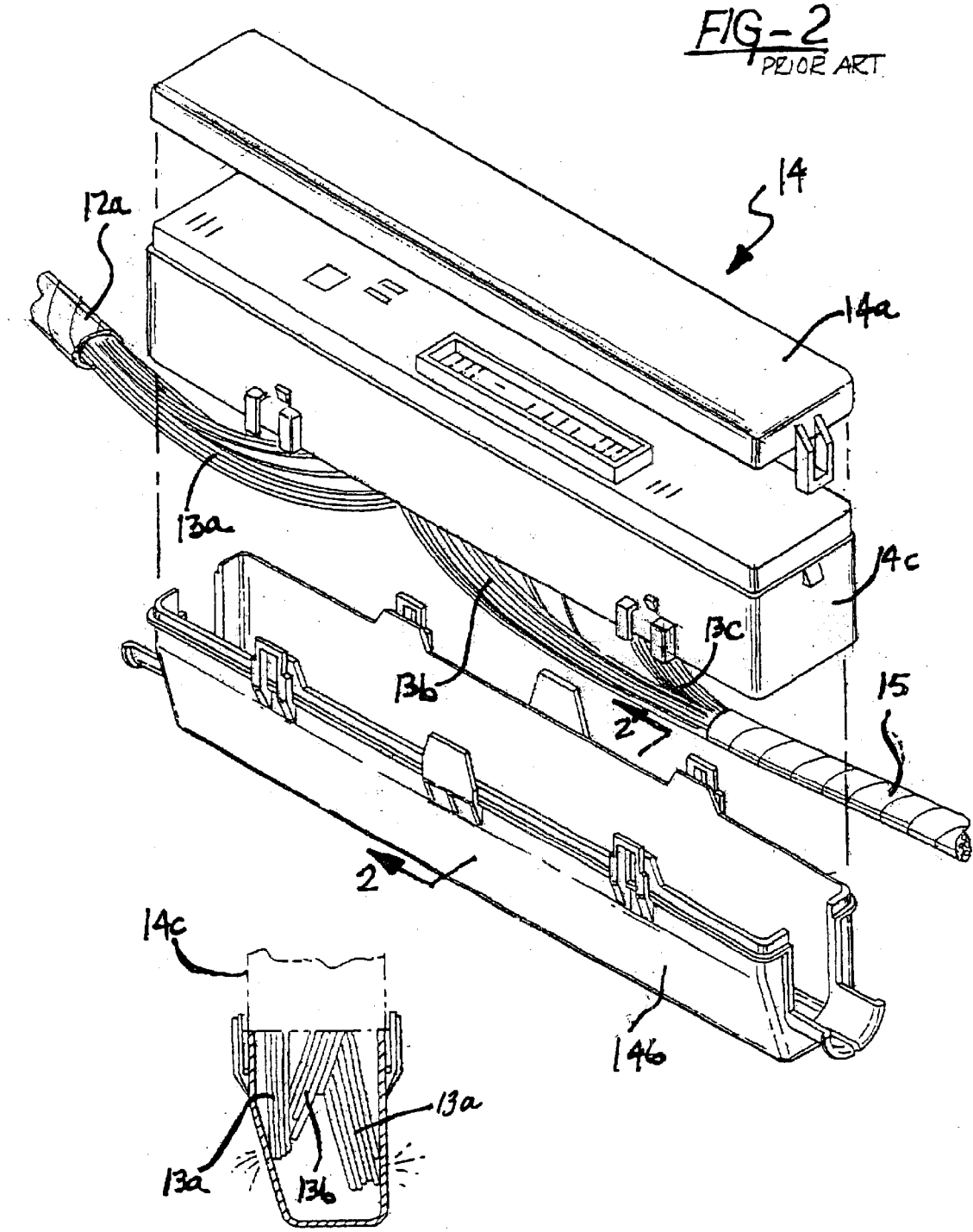
FIG. 2 is an exploded, perspective view of one of the PDB's of FIG. 1.
FIG. 3 is an end view of the PDB lower cover of FIG. 2, illustrating the rattle-causing movement of the wiring contained by the cover.
Figure 5:
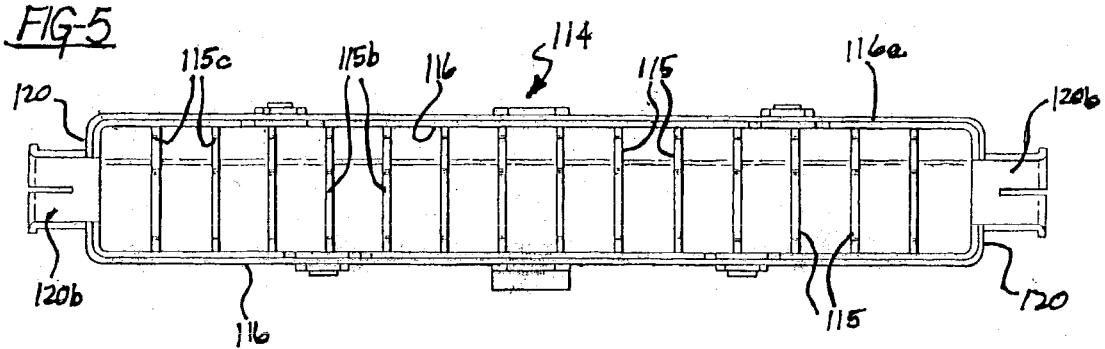
FIG. 5 is a top plan view of the lower cover of FIG. 4 according to the invention, illustrating the volume of wiring from the PDB base in phantom prior to its being inserted into the cover.

Referring to FIGS. 4 through 6, a PDB lower cover 114 according to the present invention includes sidewalls 116, a bottom 118, and open ends 120 with wire harness openings 120a and wire harness fastening provisions such as tape tabs 120b, all integrally molded from a suitable plastic as is known in the art. Cover 114, however, includes a plurality of inventive anti-rattle ribs 115 extending traversely across the sectional circumference of the cover. In the illustrated embodiment, the ribs are closely spaced (FIG. 4) and have a generally U-shaped appearance in end view (FIG. 6). Ribs 115 are preferably integrally molded into cover 114 during the molding process, although it may be possible in some circumstances to apply ribs 115 to cover 114 after cover 114 has been molded.

Ribs 115 include sides 115a extending along sidewalls 116 of the cover, sides 115a being joined by a bottom portion 115b extending across cover bottom 118. In the illustrated embodiment, ribs 115 are spaced evenly along the length of cover 114 between ends 120. Side portions 115a of the ribs preferably extend to a point adjacent the upper edges 116a of sidewalls 116. In the illustrated embodiment, each of ribs 115 is identical in terms of its thickness, shape and depth.

It will be understood by those skilled in the art that while the evenly-spaced, symmetrical arrangement of identical ribs 115 is preferred, it may be possible to utilize ribs 115 in unevenly-spaced, asymmetrical arrangements or even to alter the size and/or shape of the individual ribs or subsets of the ribs along the length of the cover, depending on the particular wiring application and the anticipated types of wire bundles (high volume, low volume, etc.) for which the PDB will be used.

Referring to FIG. 5, the unconstrained "volume" of wire bundles 13a, 13b, 13c is illustrated in phantom overlaid on the plan view of cover 114. It can be seen that the volume of the wire bundles prior to being inserted in cover 114 may tend naturally to be greater than the interior volume of the cover, or at least may not tend to lie neatly spaced from the sidewalls and bottom. This will depend to a large extent on the particular wiring application. FIG. 5 illustrates a high volume wire application.

Figure 5A:
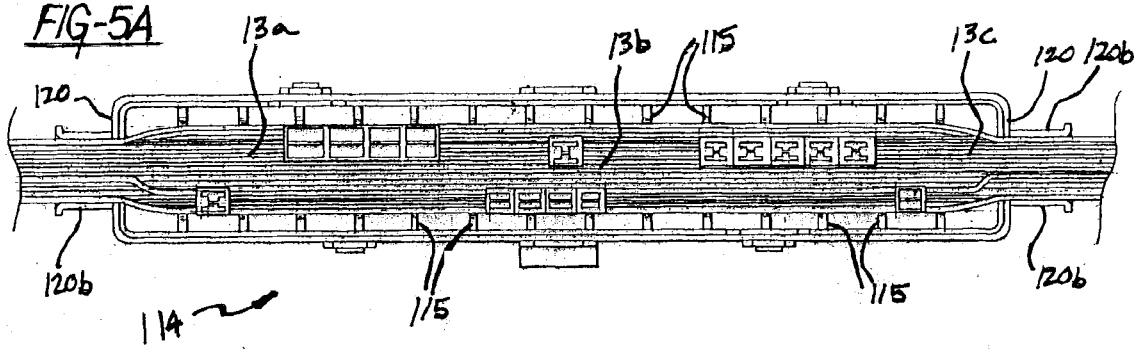
FIG. 5A is a top plan view of the cover and wiring of FIG. 5, with the wiring inserted and constrained in the cover.

FIG. 5A illustrates the wire bundles of FIG. 5 inserted in cover 114, showing the constraining effect not only of the cover sidewalls 116, contact with which is undesirable, but of ribs 115 which constrain and squeeze down the wire bundle along the length of the cover away from sidewalls 116 and bottom 118.

Ribs 115 accordingly reduce or eliminate rattle in two ways. First, ribs 115 squeeze down and constrain relatively high volume wire bundles, effectively compressing the wires so that there is no room for the wires to move around and create rattling noise. Second, even where isolated wires in a high volume bundle may have room to move, or in low volume bundles which may not be significantly squeezed or compressed by the reduced volume pathway established by ribs 115, ribs 115 drastically reduce the surface area of plastic material against which such wires can slap or rattle during vehicle vibration. Whereas a wire or wires vibrating against the high surface area, flat, relatively thin and rigid sidewalls 116 of cover 114 will create significant noise, the same wires rattling against the greatly reduced surface area of even a plurality of ribs 115 make far less noise, effectively eliminating audible wire rattle in the vehicle. Additionally, the reduction in noise by ribs 115 is not only a function of their reduced surface area, but also of the inability of the relatively thick short ribs to carry and amplify the percussive sound of rattling wires in the manner of the large, flat sidewalls 116.

In a preferred form, the upper end 115c of each rib 115 is rounded, beveled or similarly contoured to allow the wires to be smoothly inserted and squeezed down as the PDB cover and PDB base are assembled. It is also preferable to give the upper edges of bottom portions 115b a rounded contour such as 115d as best illustrated in FIG. 6. In addition, the edges along the lengths of the bottom and side portions of the ribs are rounded to prevent inadvertent cutting of the wire insulation.

Although the preferred, illustrated embodiment of ribs 115 illustrates them defining a straight and uniform reduced volume pathway through cover 114 for the wires, it may be desirable in some circumstances to offset the ribs by increasing the depth of certain portions of the ribs in alternating manner to create a somewhat serpentine rib-constrained pathway through which the wires must travel on their way out the open ends 120 of the cover.

The ribs of the present invention allow a single cover to be adapted to a reasonably wide variety of high volume and low volume wiring situations in a given vehicle or vehicles, without hindering the assembly of the cover to high volume wire bundles, and without reducing the effectiveness of noise reduction for low volume wire bundles.

Although a currently preferred embodiment of the invention has been illustrated for purposes of explanation, it will be understood by those skilled in the art that the inventive ribs may be applied to PDB covers in many different ways without departing from the scope of the present invention. It is not necessary that the ribs be applied to a "lower" cover, since they may be equally applicable to "upper" covers depending on the orientation of the PDB base and the wire bundles emanating therefrom. In some circumstances it may be desirable to place anti-rattle ribs according to the invention on both the upper and lower cover portions of a PDB. These and other variations and modifications of the invention will be apparent to those skilled in the art now that we have disclosed the foregoing embodiment.

Accordingly, we claim:

1. A power distribution box (PDB) cover adapted to be mated with a PDB base from which wires or wire bundles extend into the cover when the cover is mated to the base, the cover having a length corresponding to a length of the PDB base and at least one opening through which the wires extend longitudinally when the base and cover are mated, the improvement comprising a plurality of rattle-reducing ribs extending across the length of the cover, the ribs being closely spaced and defining a wire-constraining volume spaced from wall portions of the cover, wherein the ribs are generally U-shaped, having side portions extending up sidewalls of the cover, and bottom portions joining the side portions and extending from a bottom wall of the cover, the side and bottom portions of the ribs having edges for contacting the wires, the edges being rounded, whereby inadvertent damage to the wires is prevented.

2. The PDB cover of claim 1, wherein upper ends of the side portions of the ribs are rounded.

3. The PDB cover of claim 1, wherein the PDB cover is trough-shaped with an elongated interior defining a longitudinal wire axis and at least one open end aligned with the wire axis, and wherein the ribs are spaced along the length of the cover to constrain the wire along the wire axis.

4. In combination with a power distribution box (PDB) base from which a plurality of wires or wire bundles protrude, which wires have a generally unconstrained volume, a cover mated with the PDB base on a side of the PDB base from which the unconstrained wires protrude, the cover having an axis along which the unconstrained wires are generally aligned to exit from one or more open ends of the cover, the cover having sidewalls, a plurality of transverse ribs being formed on the interior of the cover, the ribs being closely spaced along an entire length of the axis to define a constrained volume for the wires which volume is less than the volume of the wires in their unconstrained state, and which volume is less than the volume defined by the cover sidewalls, the ribs extending up the sidewalls of the cover, upper ends of the ribs being rounded to allow the wires to be smoothly inserted and squeezed down into the cover.

* * * * *